May 9, 1944. L. M. CHRISTENSEN 2,348,451
METHOD OF PRODUCING ALCOHOL
Filed March 27, 1941
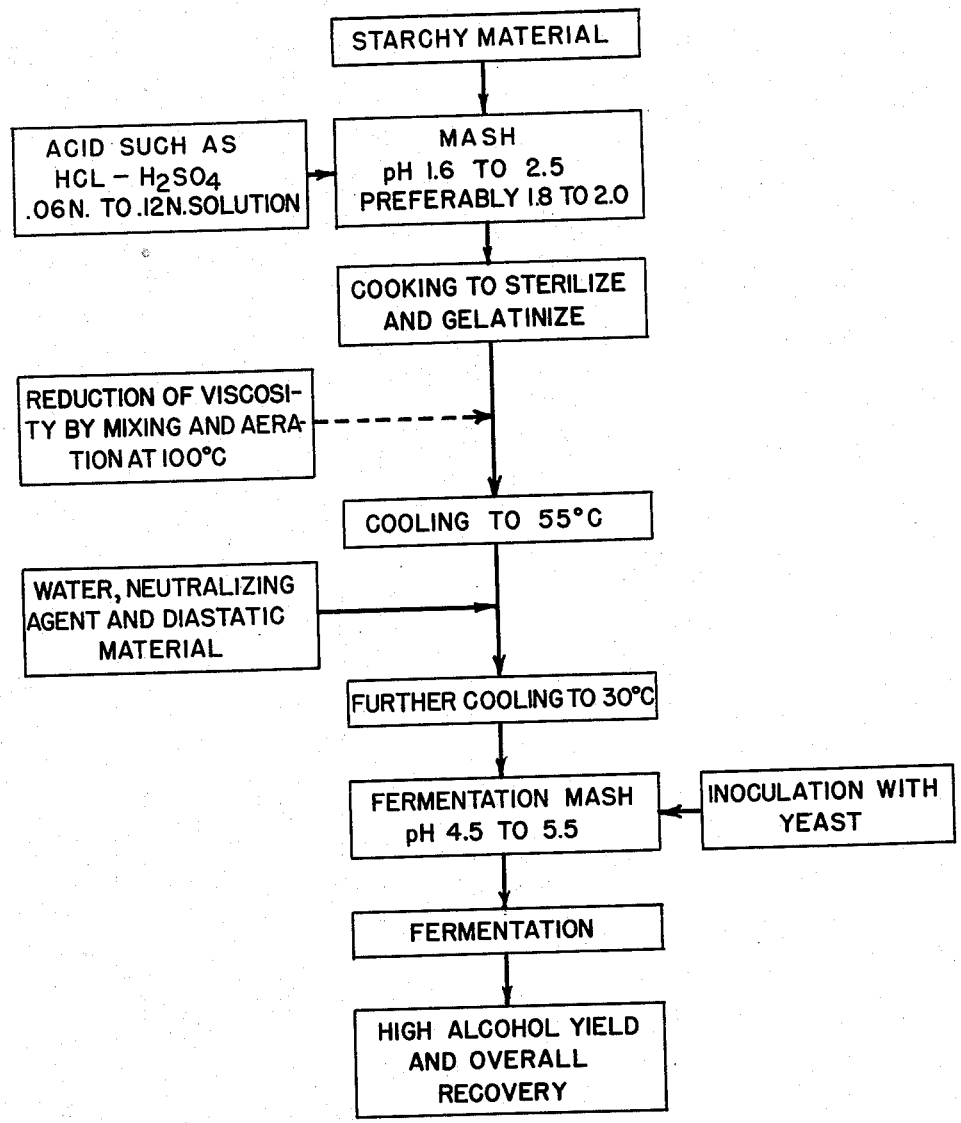
Inventor
LEO M. CHRISTENSEN
By Semmes, Keegin, Beales & Semmes
Attorneys Patented May 9, 1944

2,348,451

UNITED STATES PATENT OFFICE 2,348,451

METHOD OF PRODUCING ALCOHOL

Leo M. Christensen, Moscow, Idaho, assignor to National Agrol Company, Inc., New York, N. Y., a corporation of Delaware Application March 27, 1941, Serial No. 385,548

6 Claims. (Cl. 195—15)

This invention relates to the production of alcohol from starch and its congeners consisting largely of more or less insoluble carbohydrates of plant origin, and more especially to a method of producing ethyl alcohol in which undesirable irreversible chemical changes which ordinarily occur in the selected starchy or starch-like starting material between the cooking and saccharification steps are prevented by cooking the starchy or starch-like material in an acid medium under conditions in which conversion of the starch to fermentable sugars is minimized.

In producing alcohol from starchy materials, such as grains and tubers, the selected material usually is first subjected to a cooking step in the presence of water in order to hydrate and gelatinize the starch content, thereby rendering it available to the action of saccharifying enzymes. Such cooking also serves to sterilize the mash.

Ordinarily, the starchy material is mixed with water to produce a concentration of approximately 15 to 20 grams of starch per 100 cubic centimeters of mash, and this mash is cooked in any suitable vessel, such as a pressure cooker, at a temperature of between 100 and 140° C. for a period of about 60 minutes. The cooked mash is then cooled by vacuum evaporation in the cooking vessel or by pumping it through a suitable cooler to reduce the temperature to about 55° C., at which temperature the saccharifying agent is added. This cooling ordinarily requires approximately 60 minutes.

As pointed out in my co-pending application, Serial No. 359,433, filed October 2, 1940, certain irreversible changes occur in the starchy mash during this cooling period which profoundly affect the course of the subsequent saccharification. Apparently an irreversible hydration of the starch occurs with the result that there is a progressive increase in the amount of diastase needed for saccharification and a decrease in the yield of fermentable carbohydrates possible with the optimum ratio of diastatic material.

In my co-pending application mentioned above I disclosed a means of preventing these irreversible changes by starting with a mash containing double the concentration of starch desired for fermentation and suddenly chilling this mash after the cooking step to a temperature of 55° C. by the addition of water at the proper temperature in sufficient quantities to produce a mash of the correct concentration for fermentation. This sudden chilling having been accomplished, a material having diastatic properties was added, the mash cooled to fermentation temperature, inoculated with a suitable strain of yeast and the mixture subjected to a fermentation. The resulting product contained a high yield of alcohol and an unfermentable residue representing a low carbohydrate loss.

One of the objects of the present invention is to provide an improved method of preventing irreversible chemical changes in the starchy or starch-like material after the cooking step by cooking it in an acid medium under conditions which lead to its conversion to dextrins and the like which do not undergo this type of hydration.

Another object of this invention is to increase both the percentage of alcohol obtained from the starchy material and the over-all recovery of the residue.

A further object is to provide an alternative step of reducing the viscosity of the mash and further improving the yields of alcohol and residue by mechanically beating and aerating it at a raised temperature.

With these and other objects in view, this invention embraces broadly the idea of a method of producing ethyl alcohol in which an acid is added to the starchy or starch-like material before the cooking step. Heating the starch in this acid medium converts it to simpler compounds, probably of the type known as dextrins, which do not undergo the irreversible changes during cooling that characterize cooked starch, thereby decreasing the amount of diastatic material necessary for complete fermentation, increasing the percentage of yield of alcohol, and improving the over-all recovery.

If desired, a mash of double the concentration desired for fermentation may be used, and this material may be suddenly chilled at 55° C. by the addition of water at the proper temperature and in sufficient quantities to reduce the mash to the proper temperature and concentration in the manner described in my previously mentioned co-pending application. However, this means of cooling the mash need not be followed in this process.

I am aware that conversion of starch or the starch content of starchy materials to fermentable sugars by heating in an acid medium has been used. My process differs from that of the prior art in that it avoids the use of acid concentrations and other conditions favoring large production of fermentable sugars, while in the past these conditions had to be such that the production of fermentable sugars was at the maximum. In my process, the use of such conditions leads to reduced yields as compared to the optimum conditions described hereinafter. That is, I employ the acid cooking to convert the starches to dextrins rather than to sugars, and avoid the production of large amounts of sugars in this step of the process.

The single sheet of drawings illustrates one method by which the invention may be practiced.

In the method disclosed in the flow sheet, the selected starchy or starch-like material, such as ground grains or tubers, or the starch-rich fraction of such materials, is acidified by adding a solution of a suitable acid which may be either inorganic or organic. For this purpose hydrochloric, sulfuric or sulfurous acid is preferably employed, although an acid such as lactic acid may be used if sufficient amounts are employed to provide the required hydrogen ion concentration. Phosphoric acid is unsuitable because it either causes an undesirable phosphorylation of the carbohydrates which lowers their fermentability or yields compounds toxic to the diastatic enzymes subsequently employed. Any acid may be employed, however, which will provide the necessary hydrogen ion concentration but which does not form unfermentable compounds with the carbohydrates or produce salts or other compounds toxic to the diastatic material or to the yeast subsequently employed.

In this connection it should be noted that the preferred acid concentrations, when sulfuric or hydrochloric acid is employed, are between about 0.06 N and about 0.12 N, with the optimum at about 0.09 N. These concentrations produce a hydrogen ion concentration in the mash before cooking of between pH 1.6 and pH 2.5, and I prefer a reaction between pH 1.7 and pH 1.9. The hydrogen ion concentration after cooking is somewhat lower, usually about 0.5 pH units lower, due to the buffer action of proteins usually present with the starchy material.

Preferably the solid to liquid ratio of this mixture is about one to two although other concentrations may be used. However, if the ratio of solids to liquid is increased above approximately one to one, the yield of alcohol drops somewhat, apparently because there is not enough water present in such a mixture to provide for the necessary hydration of the starch.

After the acid has been added, the mixture is sterilized and the starch hydrated by cooking the mixture at a suitable temperature for a suitable period of time, for example, at a temperature of 110° C. for 45 minutes. The mash is then suddenly cooled by the process disclosed in my co-pending application to a temperature of 55° C. or it may be slowly cooled in any suitable manner in order to reach the temperature of 55° C. whichever cooling method is used, a sufficient quantity of water is added to produce a mash of the proper concentration for fermentation.

The acid is then neutralized or partly neutralized by the addition of a neutralizing agent, such as the oxides, hydroxides or carbonates of sodium, potassium, calcium or magnesium, or ammonia or ammonium hydroxide. The hydrogen ion concentration should be preferably between about pH 4.5 and about pH 5.5 at the time the diastatic agent is added. At this point the diastatic material is added in optimum amount, as hereinafter described.

The diastatic material employed may be any suitable enzymatic saccharifying agent, such as, for example, barley malt, rye malt, soy beans, or bacterial diastatic preparations. I prefer, however, to use as the saccharifying material the mold bran disclosed in my co-pending applications, Serial No. 360,205, filed October 7, 1940, Patent No. 2,325,638 and Serial No. 360,206, filed October 7, 1940.

It was disclosed in these co-pending applications that the optimum mold bran concentration for grain is about 2.5 grams per 100 grams of total dry grain. It has been found that this is also the optimum when the mash is cooked in the acid condition described above. In other words, within the useful range of acid concentrations, the optimum mold bran concentration is unaffected by the acid concentration used in cooking and is the same as that for rapidly cooled mash cooked without acidification. This is about half the optimum concentration for slowly cooled mashes. If barley malt or other enzymatic diastatic material is employed, the same proportions may be used as are used with rapidly cooled mashes.

The mash is then thoroughly mixed and held at 55° C. for about three hours and the temperature is then reduced to 30° C. It is then inoculated with a 24 hour old culture of $Saccharomyces\ cerevisiae$ or other suitable yeast grown in a suitable medium.

The material is then subjected to a fermentation for approximately 90 hours. After the fermentation the alcohol is removed by a distillation.

The following table illustrates the influence of acid concentration upon the yields of alcohol and the residual solids:

Table I

| Normality of HCl | Ethanol percent of total dry grain | Over-all recovery percent of total dry grain |
|---|---|---|
| 0 | 32.6 | 90 |
| 0.015 | 30.1 | 88 |
| 0.030 | 30.2 | 88 |
| 0.045 | 31.2 | 89 |
| 0.060 | 38.2 | 100 |
| 0.075 | 38.2 | 100 |
| 0.090 | 38.6 | 100 |
| 0.105 | 38.2 | 100 |
| 0.120 | 38.0 | 99 |
| 0.135 | 37.0 | 96 |
| 0.150 | 36.5 | 96 |

In obtaining the above data, the following process was followed. In this process 100 grams of high quality ground corn were mixed with 200 cubic centimeters of dilute hydrochloric acid of the strength indicated in the above table, and this mixture held 45 minutes at 110° C. The mash was then cooled at such a rate that after 30 minutes it reached 55° C., and at that point sufficient sodium hydroxide to neutralize the added hydrochloric acid and 200 cubic centimeters of water at 55° C. were added. After thoroughly mixing the mash, 2.5 grams of mold bran were added, and the mash again was mixed. It was then held at 55° C. for three hours, cooled to 30° C. and inoculated with 30 cubic centimeters of a 24 hour old culture of $Saccharomyces\ cerevisiae$ in a similar medium. After 90 hours of fermentation the alcohol was removed by distillation and measured, and the residual solids were recovered by drying the spent mash. The over-all recovery is the sum of the ethanol yield times 1.76 and the yield of the dry residual solids. The factor 1.76 is the weight of starch, in pounds, required to yield one pound of ethanol, assuming the following reaction:

$$(C_6H_{10}O_5)n + nH_2O = 2nC_2H_5OH + 2nCO_2$$

This same corn, cooked in the same way but without the addition of acid, and with rapid mash cooling as described in a co-pending application, yielded 35.9 percent ethanol and an over-all recovery of 98 percent, at a mash concentration like that in the above experiment.

Within the range of acid concentrations, 0.06 N to 0.12 N, and under the conditions of the above experiment, only 8.7 percent of the starch of the corn was converted to fermentable sugars in the cooking step. The production of fermentable sugars increased as the acid concentration was increased above the optimum, but the alcohol yields decreased. The acid treatment has the effect of decreasing the immediate yield of fermentable sugars but increasing the ultimate yield of alcohol. This is because the acid treatment converts the starch, congeners of starch, and starch-like substances into dextrins and the like which are especially suited for conversion into fermentable sugars by the enzymatic saccharification agent subsequently employed for that purpose.

In an alternate process, the acidified mash after cooking is placed at a temperature of approximately 100° C. in a high speed mixer or beater and vigorously beaten and aerated. This action causes a reduction in the mash viscosity. In this connection experience has shown that such reduced viscosity generally indicates improvement in saccharification. This result may be due to the fact that this treatment causes an hydration and partial oxidation of the dextrins produced in the acid treatment and of the starch and starch-like materials which escaped modification in the acid treatment. But it is also possible that congeners of starch, such as hemicellulose and cellulose of the corn bran, may be hydrated to yield fermentable carbohydrates, or carbohydrates that are converted to fermentable form in subsequent treatment. The remainder of the process is identical with that previously described.

The following data disclosed in Table II are average values of four runs, two with hydrochloric acid and two with sulfuric acid. There were no significant differences between the two acids as regards yields or other features of the fermentation. The procedure followed was identical to that disclosed in the process used in connection with Table I, except that the acid mash was placed hot, prior to neutralization, this time with calcium carbonate, in a beater for about 2 minutes, or until the viscosity drop previously described had occurred. The yields of residual solids are corrected for the calcium chloride or sulfate formed in the process.

Table II

| Acid normality | Ethanol percent of dry matter | Residual solids percent of dry matter | Over-all recovery percent of dry matter |
|---|---|---|---|
| 0.025 | 34.6 | 29.7 | 91 |
| 0.050 | 40.4 | 27.7 | 99 |
| 0.075 | 41.4 | 29.1 | 102 |
| 0.100 | 41.0 | 29.8 | 102 |
| 0.125 | 40.8 | 28.5 | 100 |
| 0.150 | 40.0 | 28.8 | 99 |
| 0.175 | 39.7 | 29.2 | 99 |
| 0.200 | 39.6 | 28.1 | 98 |

Again it will be noted that the preferred acid concentrations are between about 0.06 N and about 0.12 N, with the optimum at about 0.09 N. The pH range before cooking is between about pH 1.6 and about pH 2.5, and of course the material after cooking is less acid, as previously noted.

It should also be noted that the alcohol yield and the over-all recovery are considerably better than those without the mechanical treatment, which in turn are better than those in which mold bran saccharification alone is used. Another advantage not indicated in the above table is the fact that the mash viscosity is much lower when acid thinning alone is used, or when the combination of acid thinning and mechanical treatment is employed, than when these treatments are not used. Therefore, higher mash concentrations can be used by the methods disclosed in this application with resultant improvement in plant economy. With these processes, mashes yielding more than 12 percent alcohol by volume can be employed without difficulty.

In this specification and claims, the term "congeners of starch" is meant to include not only homologues of starch but carbohydrates of plant origin which are allied in nature, character or action to starch, as well as carbohydrates of plant origin which occur with starch in the source materials which are subjected to treatment in accordance with this invention. Examples of congeners of starch are the cellulosic and hemicellulosic materials which so occur and are so allied.

I claim:
1. A method of producing alcohol from starch and its congeners comprising acidifying a selected starchy material with an acid selected from the group consisting of lactic, hydrochloric and sulphuric acid, cooking the thus treated materials under controlled conditions of temperature and acidity which will favor the production of dextrins rather than sugar, to produce a mash containing a low concentration of sugar, cooling and partially neutralizing the mash to obtain saccharifying conditions, and then adding a diastatic material and yeast to promote fermentation.

2. A method of producing alcohol from starch and its congeners comprising acidifying the selected starchy material to obtain a hydrogen ion concentration within the range of from pH 1.6 to 2.5, with an acid selected from the group consisting of lactic, hydrochloric and sulphuric acid, cooking the thus treated material under conditions of temperature and time which will favor the production of dextrins rather than sugar, to produce a mash containing a low concentration of sugar, cooling and partially neutralizing the mash to obtain saccharifying conditions, and then adding a diastatic material and yeast to promote fermentation.

3. A method of producing alcohol from starch and its congeners comprising cooking the selected starchy material in the presence of an acid selected from the group consisting of lactic, hydrochloric and sulphuric acid, reducing the viscosity of the sterilized mash by aeration, cooling, and partially neutralizing the mash to obtain saccharifying conditions, and then inoculating with a diastatic material and yeast, the temperature and length of said cooking step and the hydrogen ion concentration during said cooking step favoring the production of dextrins rather than sugar, to produce a mash containing a low concentration of sugar.

4. A method of producing alcohol from starch and its congeners comprising cooking an acidified starchy material having a pH of from 1.6 to 2.5, said hydrogen ion concentration being obtained by adding an acid selected from the group consisting of lactic, hydrochloric and sulphuric acid, the temperature and length of said cooking step and the hydrogen ion concentration favoring the production of dextins rather than sugar, to produce a mash containing a low concentration of sugar, cooling, and then reducing the acidity of the mash to a pH between 4.5 and 5.5 and inoculating with diastatic material and yeast to promote fermentation.

5. A method of producing alcohol from starch and its congeners comprising cooking an acidified starchy material having a pH of from 1.6 to 2.5 for a period between 15 and 60 minutes at a temperature within the range of from 100 to 150° C., said hydrogen ion concentration being obtained by adding an acid selected from the group consisting of lactic, hydrochloric and sulphuric acid, the conditions of temperature, time and acid concentration of said cooking step favoring the production of dextrin rather than sugar, to produce a mash containing a low concentration of sugar, cooling, and reducing the acidity to a pH between 4.5 and 5.5, inoculating with a diastatic material to maintan the production of sugar and then inoculating with yeast to convert the sugar into alcohol.

6. A method of producing alcohol from starch and its congeners comprising cooking an acidified starchy material, having a pH of from 1.6 to 2.5, said hydrogen ion concentration being obtained by adding an acid selected from the group consisting of lactic, hydrochloric and sulphuric acid, the temperature and length of said cooking step and the hydrogen ion concentration favoring the production of dextrins rather than sugar, to produce a mash containing a low concentration of sugar, reducing the viscosity of the sterilized mash by aeration, adding an alkaline compound to reduce the acidity to a pH between 4.5 and 5.5, inoculating with a diastatic material to maintain the production of sugar and then inoculating with yeast to convert the sugar into alcohol.

LEO M. CHRISTENSEN.